Feb. 21, 1967  SHINNOSUKE FUNAKUBO  3,304,968
BAND SAW AND THE SAWING DEVICE THEREOF
Filed Feb. 19, 1964
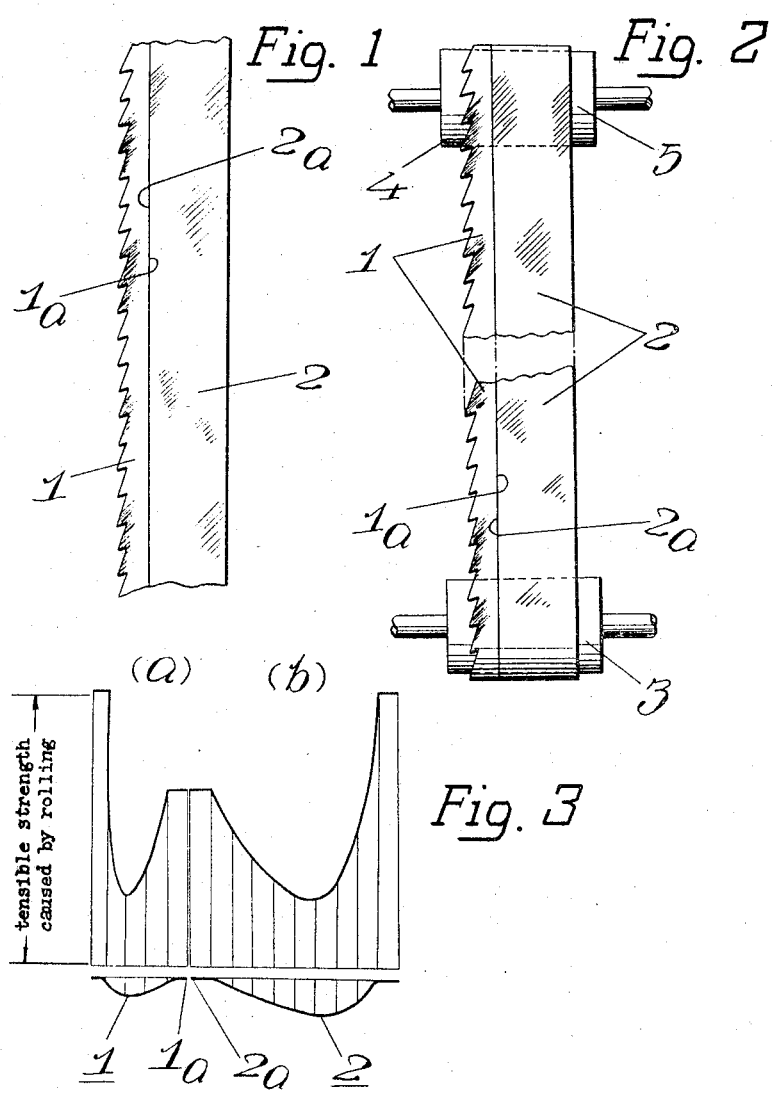
INVENTOR.
Shinnosuke Funakubo
BY
Jacob L. Kollin
ATTORNEY United States Patent Office 3,304,968
Patented Feb. 21, 1967

3,304,968
BAND SAW AND THE SAWING DEVICE
THEREOF
Shinnosuke Funakubo, 19 3-chome, Fukagawa
Takabashi, Koto-ku, Tokyo, Japan
Filed Feb. 19, 1964, Ser. No. 346,015
Claims priority, application Japan, Apr. 11, 1963,
38/17,756, 38/17,757
2 Claims. (Cl. 143—17)

The present invention relates to a novel band saw and the sawing device therefor, chiefly used for sawing wood and metal.

The main object of the present invention is to provide a band saw of the type which is adapted for sawing wood and metal, by providing two kinds of blades: a blade of narrow width having tooth projections, and another supporting blade of broad width which serves as a counterpart for the former, by being disposed in abutting contact with the edge side of the former, and also by engaging the both blades with a band sawing device of the present invention, which is either of rip saw or cross cut saw type, in constant abutment therebetween.

Another object of the present invention is to provide a band saw which is uniquely adapted for the realization of more simplified production-processes and lower-cost mass production, by employing a blade of narrow width having tooth projections and made of high speed steel plate, and a supporting blade of broad width, made of ordinary steel plate.

Still another object of the present invention is to provide an improved band sawing device for sawing wood and metal, which is characterized by a pair of driven saw wheels and tension adjustments therefor, whereby a blade of narrow width having tooth projections and a supporting blade of broad width, forming the components of a band saw of the present invention, are respectively tightened in operation and are in contact with each other at the trailing edge of the former and the leading edge of the latter.

There are already known band saws called "inserted tooth saws" characterized by a freely changeable tooth portion, the tooth portion and saw blade portion being made separately, and engaging with a recess portion on the saw blade portion thereof. Such types of saws, because of the requirements of highly advanced techniques in production, have had several kinds of fatal faults, so that they have been scarcely used in practice.

Some of these saws have been formed by a usual method of welding a narrow edge portioned steel plate and another wide guiding portioned steel plate. However, they still have had another disadvantage of requiring a great skill in welding operation.

The production of all these saws has proven expensive.

The present invention, on the contrary, does not employ the methods employed for conventional types of saws; a narrow edge portioned plate and a wide guiding portioned plate are manufactured separately, which then form an inserted tooth saw or a jointed tooth saw using such means as welding or connecting parts, to join the both plates.

A unique idea of the present invention is the provision of a novel band saw which in practice makes it possible to be used for sawing operation, in independent separation and close contact between the two blades at their opposite inner edges.

In the present band saw, conventional difficulties requiring forming whole portions of a saw by using steel plate for saw-manufacturing, and welding the tooth projected plate portion and the guiding plate portion thereof, or a complicated joining of parts therefor, are being avoided.

Thus, the present band saw, as compared with conventional band saws, results in comparatively better, excellent effects in that it can be manufactured at a lower cost, with easier processes, and at the same time can be more effective in operation.

The present band saw may be adapted to any conventional band sawing device. However, preferably it is desirable to be actuated by the sawing device of the present invention especially meant for rotating the present band saw through engaging respective ends of said two blades of the band saw over a driving saw wheel and also engaging the other ends of the two blades over a pair of driven saw wheels which have respective automatic tension adjustments, because by these steps said two blades inevitably come to be closely in abutment with each other under a moderate tension constant.

The aforementioned and other objects to be mentioned will be described in the specification and the accompanying claims.

In the drawings, FIG. 1 is a front view which shows a part of a band saw embodied according to the present invention, FIG. 2 a front view of the same, and FIG. 3($a$ and $b$) is a pair of graphs which show an example of rolling made on the blades of the present invention and the distribution of tension caused thereby on said blades.

Referring now to the drawings, in one of the embodiments of the present invention, 1 is a blade of narrow width having tooth projections formed by hardening a high speed steel plate, and 2 is a supporting blade of broad width made from a moderately hardened ordinary steel. Both blades are adapted to contact each other at their opposite inner edges 1$a$, 2$a$ thereof.

The blade 1 and the supporting blade 2 are formed as loops, so as to be disposed in parallel with each other one the same plane over a driving saw wheel 3, and over driven saw wheels 4, 5 which are equipped with respective automatic tension adjustments not shown for adjusting independently the tension of the blade 1 and the supporting blade 2.

Of the existing methods of increasing tensions on the band saw in operation, rolling a saw blade, for producing a tensioning zone thereon, is well known to the skilled in the art. The saw blade is rolled inwardly from both edges thereof.

Due to the relatively small tension on the rolled portion of the saw blade it is often subject to damage due to excessive tension.

The tooth line side and the trailing edge side should withstand great tensions in order to avoid damage to the saw blade in sawing operation.

The un-rolled portions of a band saw blade, that is, the tensioning zones which strain the blade are on the other hand adapted to form contact faces between the saw blade and the saw wheel, and their contact with the tire face thereof should be a close contact.

Thus, when the tensioning zone is too narrow in breadth, it causes undesirable slips in operation, which makes it impossible to maintain the tension thereof, and further causes lateral movement of the saw at said tire face.

The object of the present invention is (1) to increase the tension of the tooth line side and the trailing edge side of a saw blade to the maximum in sawing operation so that the saw blade may not be accidentally bent in the operation, and (2) simultaneously widen the tensioning zone to the maximum so that a reliable contact thereof may be kept with the tire face.

The band saw according to the present invention, comprises a narrow width blade 1 and a broad width supporting blade 2, which enables the two blades to be rolled separately. Thus, comparatively great tensioning zones can be naturally formed, especially compared with the saw breadth thereof, and both the tension on the tooth line side of said blade and the tension on the trailing edge side of said supporting blade may be respectively produced at will by an independent rolling. When compared with any conventional band saw, the present one has a contact portion with the tire face even at the centre thereof, by which the heat transfer during its rotary operation is effected from said blade 1, through the closely adjacent supporting blade 2, and that it will withstand any stress, is adapted for use, and further that the sawing operation thereof can be done smoothly without causing any hindrance by the play of tension which in operation effectively and suitably act against the thermal expansions of both blade 1 and 2, because said blade 1 and supporting blade 2 have respective driven saw wheels 4, 5 properly engaged therewith.

In rolling the present band saw, it is also possible to give a rolling, as generally performed with conventional band saw blades, only to the blade 1, at the same time using the supporting blade made of the band steel which is neither given any special rolling nor hardening.

It shall be appreciated that, as shown in FIG. 3(a and b), both the blade 1 and the supporting blade 2 can be processed by rolling them respectively into a blade possessed of a uniquely strong tooth line tension, and a supporting blade possessed of a uniquely hard trailing edge side tension. By these rolling processes, the tensioning zones which form a contact portion between both blades, can be situated in parallel on the same plane thereof, creating close contact with each other at their edges in operation. Close contact is maintained with the tire face, serving to dissipate the heat during sawing.

While the embodiment of the present invention as herein disclosed constitutes a preferred form, it is to be understood that other forms may be adapted, all coming within the scope of the claims which follow.

Having now particularly described and ascertained the nature of my said invention and in what manner the same is to be performed, I declare that what I claim is:

1. In a band saw machine having supporting wheels, a saw blade of narrow width having tooth projections on the leading edge and a supporting blade of broad width, said blades being mounted on the wheels, and being in abutting contact with each other at the trailing edge of said saw blade and the leading edge of said supporting blade.

2. A band saw machine as claimed in claim 1, in which said saw blade is of highly hardened high-speed steel and is possessed of a strong tooth line tension and said supporting blade of a moderately hardened steel and is possessed of a trailing edge tension.

References Cited by the Examiner

UNITED STATES PATENTS

| 182,178 | 9/1876 | Disston | 143—139 |
|---|---|---|---|
| 2,787,299 | 4/1957 | Anderson | 143—133 |

FOREIGN PATENTS 400,565  10/1933  Great Britain.

DONALD R. SCHRAN, *Primary Examiner.*